(12) United States Patent
Posthuma

(10) Patent No.: US 6,694,012 B1
(45) Date of Patent: Feb. 17, 2004

(54) SYSTEM AND METHOD TO PROVIDE CONTROL OF MUSIC ON HOLD TO THE HOLD PARTY

(75) Inventor: Carl Robert Posthuma, Wheaton, IL (US)

(73) Assignee: Lucent Technologies Inc., Murray Hills, NJ (US)

( * ) Notice: Subject to any disclaimer, the term of this patent is extended or adjusted under 35 U.S.C. 154(b) by 0 days.

(21) Appl. No.: 09/386,108

(22) Filed: Aug. 30, 1999

(51) Int. Cl.[7] .......................... H04M 1/00; H04M 9/00
(52) U.S. Cl. ................... 379/393; 379/158; 379/162; 379/202.01
(58) Field of Search ................. 379/156, 157, 379/162, 158, 202.01, 203.01, 204.01, 207.01, 374.01, 374.02, 390.03, 390.04, 393, 88.16, 166

(56) References Cited

U.S. PATENT DOCUMENTS

| | | | | |
|---|---|---|---|---|
| 4,577,067 A | * | 3/1986 | Levy et al. | 379/101.01 |
| 5,519,774 A | * | 5/1996 | Battista et al. | 379/386 |
| 6,031,905 A | * | 2/2000 | Furman et al. | 379/201 |
| 6,178,237 B1 | * | 1/2001 | Horn | 379/202 |
| 6,301,337 B1 | * | 10/2001 | Scholtz et al. | 379/30 |
| 6,349,136 B1 | * | 2/2002 | Light et al. | 379/202.01 |
| 6,424,938 B1 | * | 7/2002 | Johansson et al. | 704/216 |
| 6,549,587 B1 | * | 4/2003 | Li | 375/326 |
| 6,556,670 B1 | * | 4/2003 | Horn | 379/202.01 |
| 2003/0138061 A1 | * | 7/2003 | Li | 375/326 |

* cited by examiner

Primary Examiner—Binh Tieu
(74) Attorney, Agent, or Firm—Michael Johannesen; Steven Santema

(57) ABSTRACT

A system and method that provides a party that has been placed on hold control of music on hold. A dual-tone, multifrequency (DTMF) detector and a processor in the music on hold system monitor two-way connection. If a predefined DTMF signal is detected, the DTMF detector notifies the processor to disable the music on hold. Further, a DTMF code may be defined to cause the processor to decrease/increase the volume of the music on hold.

8 Claims, 4 Drawing Sheets

SYSTEM AND METHOD TO PROVIDE CONTROL OF MUSIC ON HOLD TO THE HOLD PARTY

TECHNICAL FIELD

This invention relates to the field of telephone system features, and, more specifically, to a new feature to provide the far end party the ability to control music on hold.

BACKGROUND OF THE INVENTION

Any participant on a conference call can place his or her telephone on hold. If a "music-on-hold" feature is assigned to that participant's line, music is played back to the far end party. In the conference example, however, the far end party is all of the other participants on the conference call. The injected music disrupts the conference call and there is no way for the remaining participants to identify or isolate who initiated the hold. Furthermore, a person placed on hold may not want to listen to the choice of music on hold or the music or message may be too loud. Therefore, there is a need in the art for the party on hold to control whether or not music is played and at what volume.

SUMMARY OF THE INVENTION

This problem is solved and a technical advance is achieved in the art by a system and method that provides a party that has been placed on hold control of the music on hold. This advancement is achieved by adding a dual-tone, multifrequency (DTMF) and/or speech detector and a processor in the music on hold system, or, alternatively, to the music on hold system connection. A two-way connection is established to the music on hold system. The detector monitors the incoming signals and, if a predefined signal string is detected, the detector notifies the processor to disable the music on hold. Further, a code may be defined to cause the processor to decrease/increase the volume of the music on hold, change the program etc.

A further embodiment provides an energy detector and a processor connected to the two-way connection on the music on hold system. The detector monitors the incoming signal for energy of any kind. If energy is detected, then the detector notifies the processor to disable or lower the volume of the music on hold. If there is no energy detected after a predetermined time period, then the volume can be increased to indicate that the party is still on hold.

BRIEF DESCRIPTION OF THE DRAWINGS

A more complete understanding of the invention may be obtained from consideration of the following description taken in conjunction with the drawings in which.

DETAILED DESCRIPTION

Figure 1:
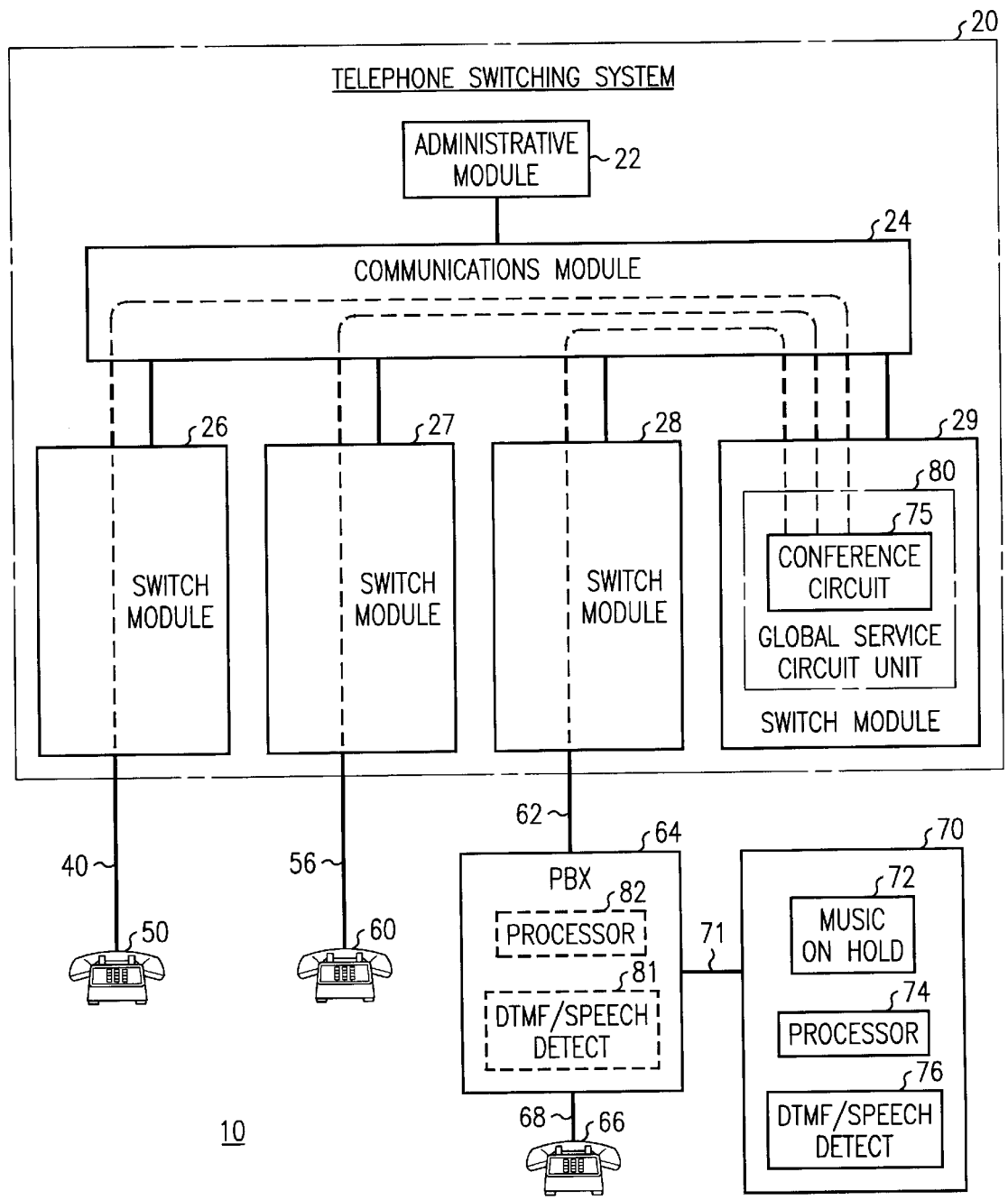
FIG. 1 is a block diagram of a telephone system in which an exemplary embodiment of this invention may be implemented.

This invention will be described in the context of the telephone system 10. Telephone system 10 includes a telephone switching system, or "switch" 20. Switch 20 is the same or similar to a 5ESS® switch manufactured by Lucent Technologies. Switch 20 comprises an administrative module 22, a communication module 24, and a plurality of switching modules represented by switching modules 26, 27, 28, and 29. In a typical 5ESS switch installation, there are usually more switching modules. Administrative module 22 provides coordination of the functional components of switch 20 and human machine interface.

Administrative module 22 is connected to communications module 24, which acts as a hub among switching modules 26–29 and administrative module 22. Each switching module 26–29 terminates subscriber lines and trunks, as is known in the art. For purposes of this exemplary embodiment, switching module 26 is connected via line 40 to telephone 50 and switching module 27 is connected via line 56 to telephone 60. Switching module 29 includes conference circuit 75 in a global service circuit unit 80. Switching module 28 is connected via one or more trunks 62 to Private Branch Exchange (PBX) 64. PBX 64, as is known in the art, is a small switching system that serves business customers. Telephone 66 is connected to PBX 64 via line 68.

Many PBXs, such as 64, include a system for "music on hold" 70. In the prior art, the user of telephone 66 pushes a "hold" button or flashes a switchhook and the PBX 64 disconnects the call to telephone 66 and sets up a one-way connection from music on hold system 70 to the far end party. In the prior art, the only manner in which the far end party could stop the music on hold is to hang up. If the far end party is queued for service, then he or she loses the queue slot. If the far end party is a conference call (as in this illustration), then the entire conference is disrupted until all parties hang up or until the first party releases the hold.

According to an exemplary embodiment of this invention, telephones 50, 60, and 66 are engaged in a three-way conference call connected through conference circuit 75, as is known in the art. For purposes of this exemplary embodiment, participant 66 places the other participants in the conference on hold. However, none of the remaining conference participants know exactly which member of the conference has caused music to be injected on the line. According to this exemplary embodiment, music on hold system 70 is connected to PBX 64 by a two-way line 71. According to this invention, the user of telephone 50 enters a code, such as a predefined *XX code via dual-tone, multifrequency digits (DTMF), to activate a feature according to this exemplary embodiment, that, for example, turns off music on hold. DTMF detector 76 receives the *XX code (DTMF string) and notifies processor 74. Processor 74 causes the outgoing signal from the music on hold source 72 to cease for that circuit. DTMF detector 76 may also be a speech or DTMF and speech detector. In this embodiment, the speech detector is listening for a word string such as "turn that music off". Further, a combination of DTMF and speech may be used to control the music on hold system. For example, a DTMF digit may precede key word commands to inform the detector that the next word or words is/are instructions and should be recognized.

Alternatively, the conference participants may want to know when the participant at telephone 66 rejoins the conference. In this case, they would want the music on hold to continue in the background. Therefore, participant 50 or 60 enters predefined *XX code that causes processor 74 to decrease the volume from music on hold source 72. In a two-party call, this alternate feature gives the on-hold party control to have no music/message, softer or louder.

Many different features may be implemented using this exemplary embodiment of this invention. For example, the music on hold source 72 may be a multi-track tape or a radio. A DTMF string or voice commands could be defined to advance the channel to a station or program source that the person on hold prefers. Additionally, the person on hold may wish to change the tone of the content, so it is weighted for compatibility with abilities or aesthetic reasons. Again, the tone control may be stepped so that there is first a bass emphasis, then a midrange emphasis, then a high range emphasis, etc., in a cyclical manner each time the tone modification signal is received. Further, it may be desirable to turn the music on hold back on to determine whether the party who placed the call on hold to determine whether the line is still active. Also, the music on hold system could prompt via processor 74, the on hold party to give instructions on how to modify the message, turn it off, change content, etc.

In another embodiment DTMF/speech detector 81 and processor 82 may be located at the connection to the music on hold system 70, as shown in phantom in PBX 64.

Figure 2:
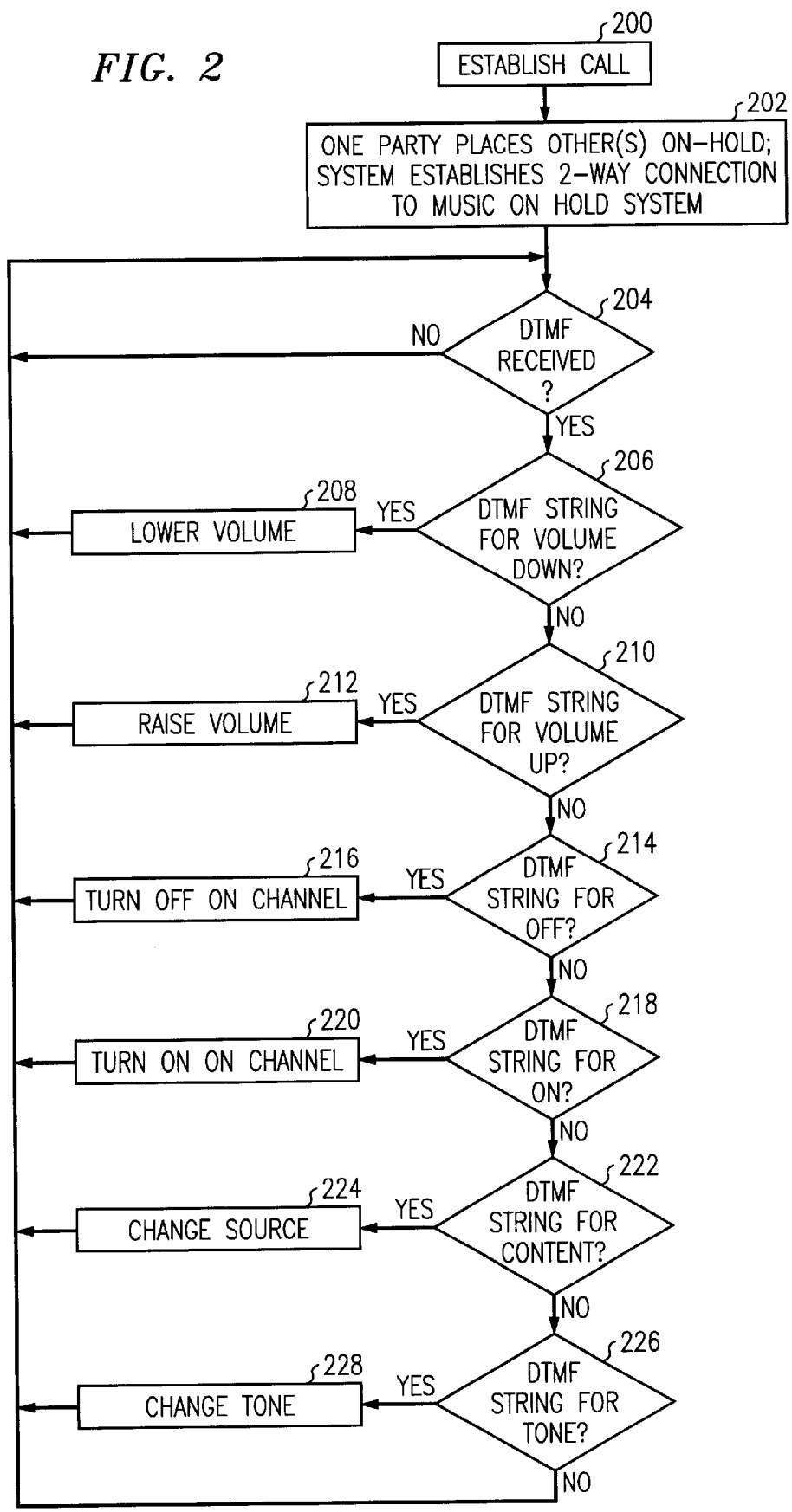
FIG. 2 is a flow chart of processing according to a method of the exemplary embodiment of FIG. 1.

Turning now to FIG. 2, a flow chart of processing according to an exemplary embodiment of this invention is shown. Processing starts in action box 200 where a call is established. Processing continues to action box 202 where one party places the other party or parties on hold. In response to which, this system establishes a two-way connection between music on hold system in place of the communication link with the party who placed the others on hold. Processing continues to decision diamond 204 where a determination is made if DTMF digits are received. If no DTMF digits are received, processing waits until either DTMF signals are received or the call is taken off hold.

Processing continues if DTMF digits are received in decision diamond 204, then processing continues to action box 206 where an interpretation of the DTMF string is made. If the DTMF string represents turning down the volume, then in action box 208 the volume on the outgoing music on hold signal is lowered. Processing continues back to decision diamond 204.

If in decision diamond 206, the DTMF string was not for volume down, then in action box 210 determination is made if the DTMF string represents volume up. If so, processing continues to action box 212 where the volume is raised. Processing continues back to decision diamond 204.

If, in decision diamond 210, the DTMF string did not represent volume up, then, in decision diamond 214 a determination is made if the DTMF string represented off. If, in decision diamond 214, the DTMF did represent off, then processing proceeds to action box 216 where the music on hold is turned off for that specific call.

If in decision diamond 214, the DTMF string did not represent off, then in decision diamond 218, a determination is made if the DTMF string represented on. If the DTMF string did represent on, then in action box 220, the music on hold is turned back on and processing loops back to decision diamond 204. If the string did not represent on, then processing proceeds to decision diamond 222 where determination is made if the DTMF string indicated a change of content. If the string did indicate a desired change of content, then in action box 224, the content is changed. For example, a (change of station or tape track). This could be, for example, changing a radio station or changing tracks on a tape. This selection may be, for example, a cyclical selector in the same fashion as a seek button on current car radios. Additionally, there may be a direct selection option, such as "*c" for classical and "*cw" for country and western, etc.

If in decision diamond 222, the DTMF string did not represent a change in content, then in decision diamond 226, determination is made whether the string indicated a desire change in tone. If the string did represent a desire in change in tone, then in action box 228 the tone is changed. Such change in tone may be needed to shape the frequencies for hearing impaired or aesthetic reasons. Processing loops back to decision diamond 204. If the DTMF string did not represent tone, then processing loops back to decision diamond 204 to determine if there are other DTMF strings received.

Figure 3:
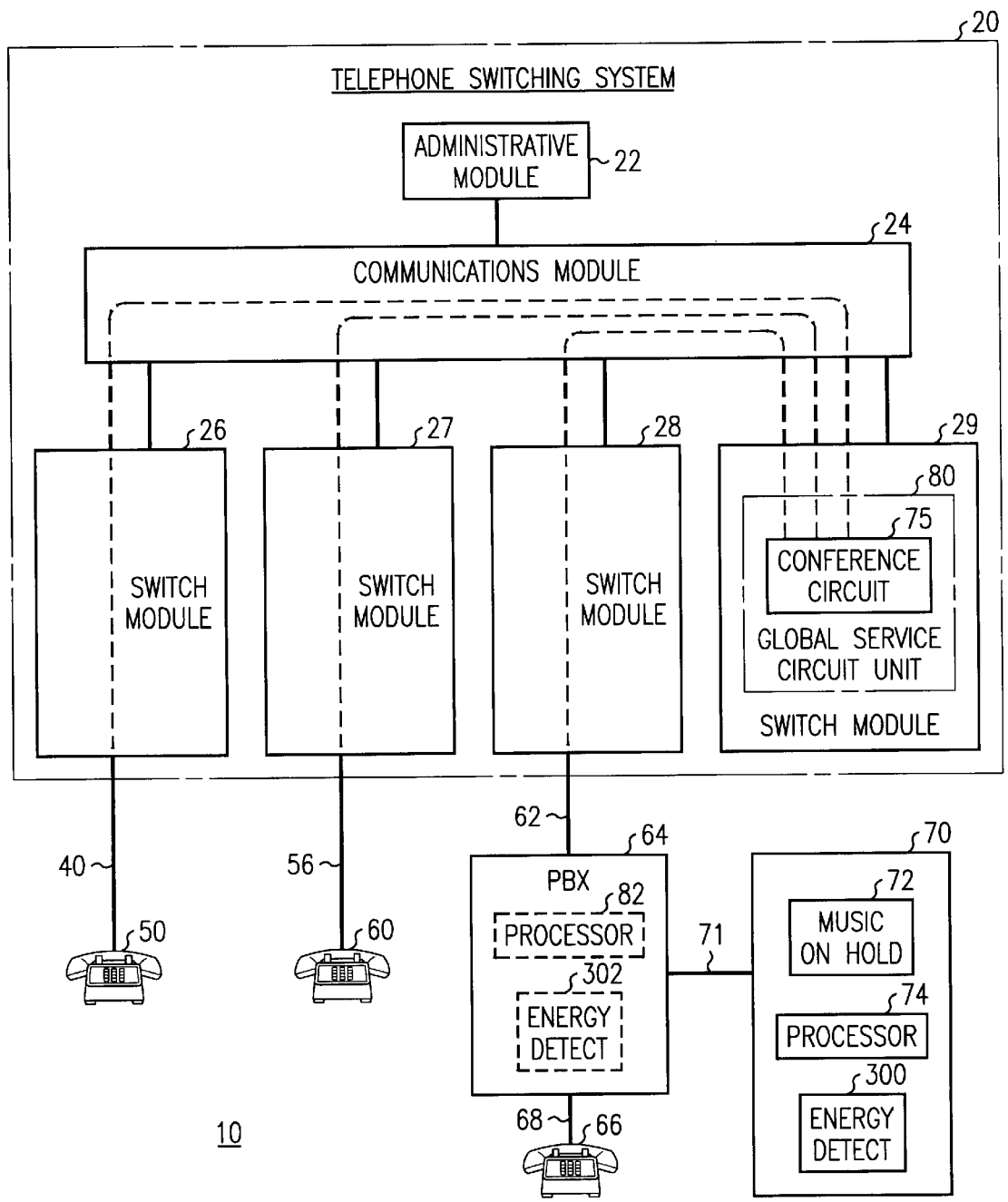
FIG. 3 is a block diagram of a telephone system employing a further embodiment of this invention.

Turning now to FIG. 3, another exemplary embodiment of this invention is shown. The telephone system of FIG. 3 is similar to the telephone system of FIG. 1 except that, instead of a DTMF/speech detector, an energy detector 300 is utilized. The energy detector 300 may be in the music on hold system 70 or, alternatively, in the PBX 64 (energy detector 302). According to this exemplary embodiment, when a party is placed on hold, a two-way connection is established to the music on hold system 70. Energy detector 300 listens for any form of energy on the incoming side of the signal. In most instances, incoming energy would be speech from the far end or from other participants on a conference. If energy is detected, then processor 74 lowers the volume of the music on hold system 70 so that it is not disruptive to any conversation.

Energy detector 300 continues to monitor the line. When a drop in energy is detected, processor 74 times the drop in energy and, after a predetermined time, reapplies the music on hold onto the line. In this fashion the music (or other content) on hold will drop out when other conference participants are speaking, but will come back on to remind the conference participants that they are on hold when no one has been speaking after a predetermined time (for example, 5 seconds).

Figure 4:
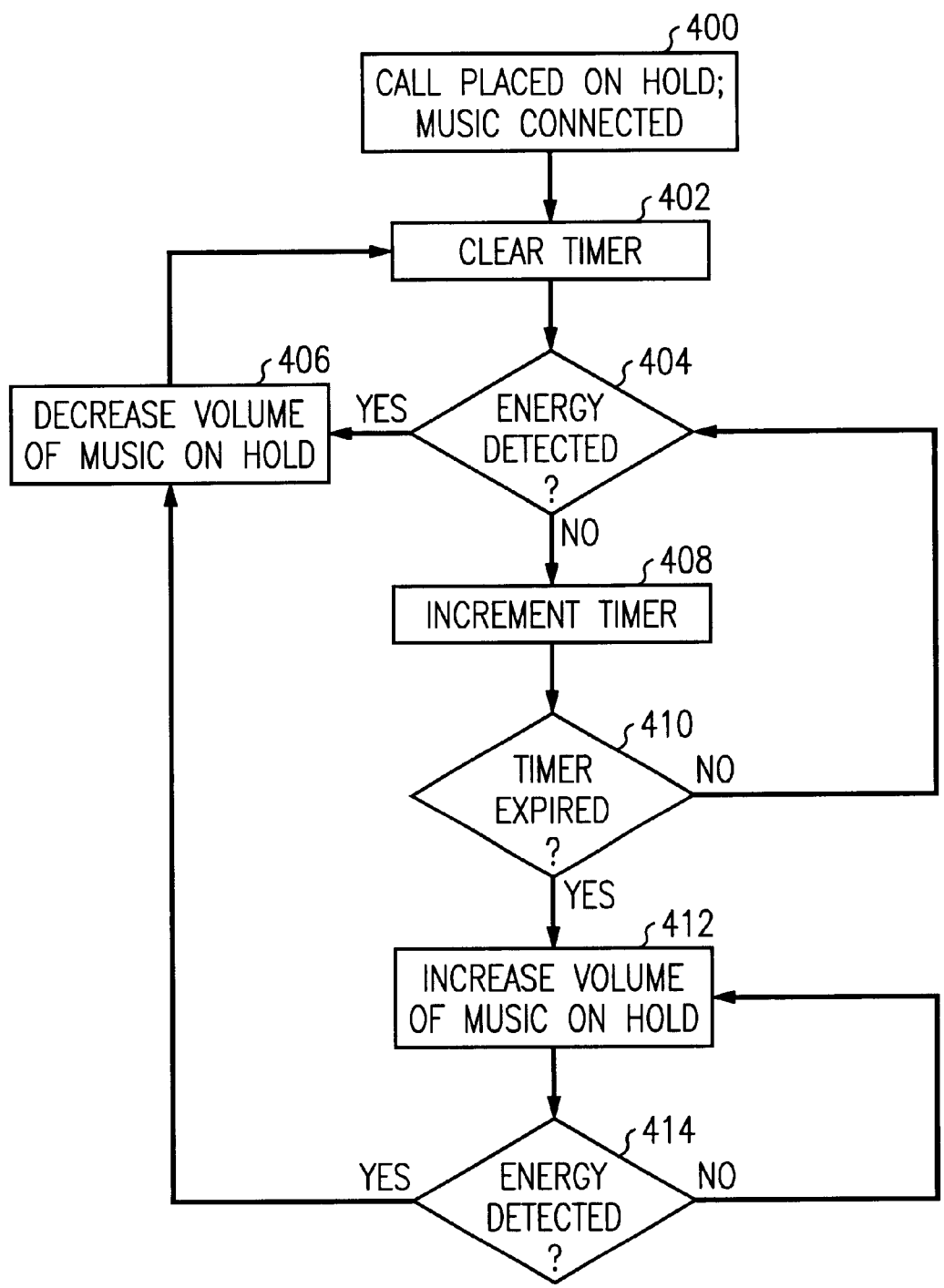
FIG. 4 is a flow chart of processing according to a method of the exemplary embodiment of FIG. 3.

Turning now to FIG. 4, a flowchart according to the exemplary embodiment of FIG. 3 is shown. Processing begins in box 400 where the call is placed on hold and the music is connected via a two-way connection. Processing continues to action box 402, where a timer is cleared. Processing continues to decision diamond 404 where a determination is made if energy is detected on the incoming portion of the connection. If energy is detected, then processing moves to box 406 where the volume of the music on hold is decreased (to a predetermined minimum). Processing then loops back to action box 402.

If energy is not detected in decision diamond 404, then, in action box 408, the timer is incremented. A determination is made in decision diamond 410 as to whether the timer has expired (a predetermined time period had lapsed, e.g., 5 or 10 seconds). If the timer has not expired, then processing loops back to decision diamond 404.

If in decision diamond 410 the timer has expired, then processing proceeds to action box 412 and the volume of the music on hold is increased. A determination is then made in decision diamond 414 whether energy is detected. If energy is not detected, then processing loops on increasing the volume of the music on hold (up to a predetermined maximum) in action box 412. If energy is detected in decision diamond 414, then processing moves to action box 406 where the volume of the music on hold is decreased.

It is to be understood that the above-described embodiment is merely an illustrative principle of the invention and that many variations may be devised by those skilled in the art without departing from the scope of the invention. It is, therefore, intended that such variations be included within the scope of the claims.

What is claimed is:

1. A method for controlling music on hold in a telephone system, said method comprising the steps of:

setting up an incoming and an outgoing connection to the music on hold system;

transmitting music on hold on the outgoing connection;

monitoring the incoming connection for energy; and ceasing transmitting music on hold on the outgoing connection responsive to energy being received on the incoming connection above a threshold.

2. A method in accordance with claim 1 further including the step of monitoring the incoming connection for energy and transmitting music on hold on the outgoing connection responsive to energy being below a threshold for a predetermined time.

3. A method in accordance with claim 1 wherein the step of monitoring the incoming connection for energy comprises monitoring the incoming connection for speech, the step of ceasing transmitting music on hold on the outgoing connection being responsive to said speech exceeding a threshold.

4. A method in accordance with claim 3 further including the step of monitoring the incoming connection for speech and transmitting music on hold on the outgoing connection responsive to said speech falling below a threshold for a predetermined time.

5. An apparatus for providing music on hold comprising:

a two-way connection to a telephone switching system;

a music on hold source configured to provide an outgoing signal on the two-way connection;

an energy detector configured to monitor incoming signals on the two-way connection;

a processor configured to be responsive to the energy detector detecting energy above a predefined threshold to lower the volume of the outgoing signal on the two-way connection.

6. An apparatus according to claim 5 wherein the processor is configured to increase the volume responsive to the energy detector detecting energy below a predefined threshold for a predetermined time.

7. An apparatus according to claim 5 wherein the energy detector comprises a speech detector, the processor configured to be responsive to the speech detector detecting speech above a predefined threshold to lower the volume of the outgoing signal on the two-way connection.

8. An apparatus according to claim 7 wherein the processor is configured to increase the volume responsive to the speech detector detecting speech below a predefined threshold for a predetermined time.

\* \* \* \* \*